Jan. 1, 1952   H. O. ENGSTROM   2,580,745
SELF-LOCKING NUT
Filed Jan. 18, 1947
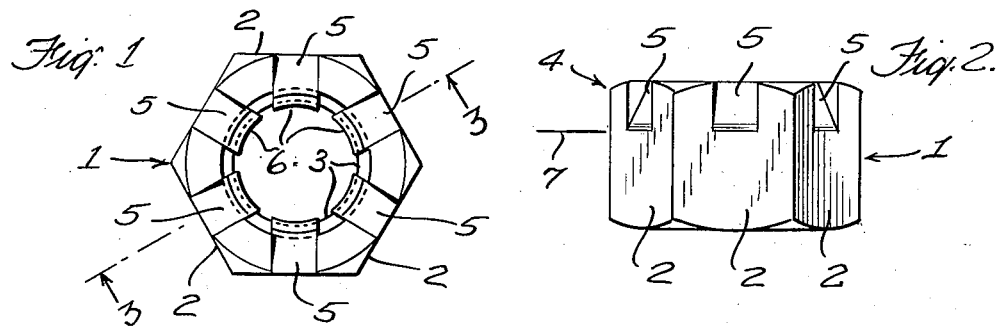
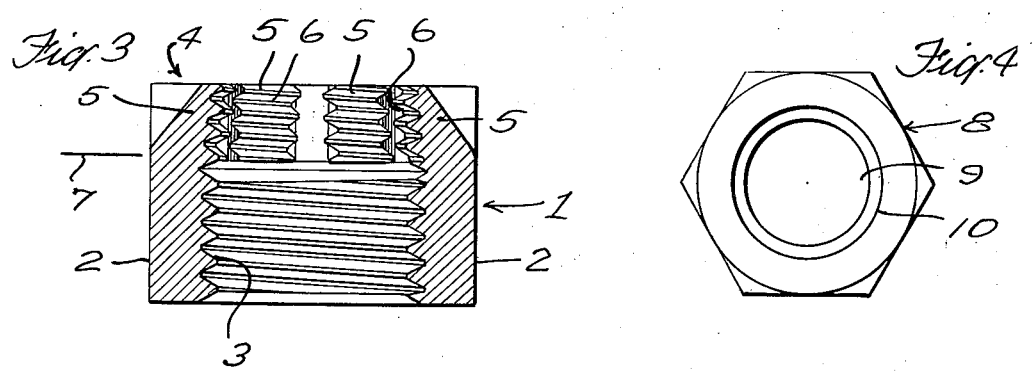
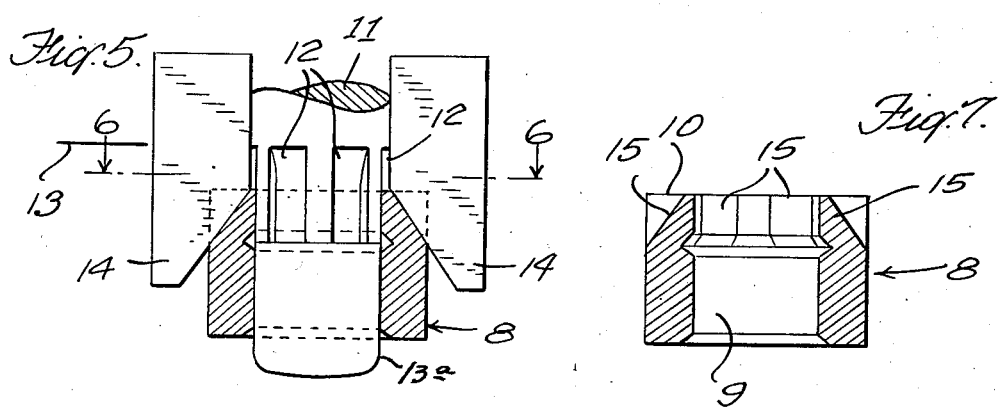
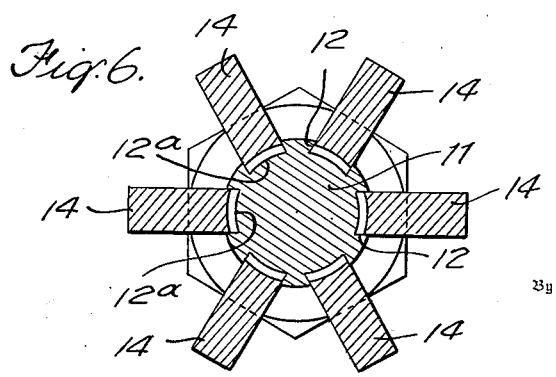
Inventor
HENRY O. ENGSTROM
George T. Gill
Attorney Patented Jan. 1, 1952

2,580,745

UNITED STATES PATENT OFFICE 2,580,745

SELF-LOCKING NUT

Henry O. Engstrom, Southport, Conn., assignor to Richard W. Luce, Southport, Conn.

Application January 18, 1947, Serial No. 722,939

5 Claims. (Cl. 151—21)

The invention herein disclosed relates to the art of self-locking nuts and comprehends a self-locking nut and a method of making self-locking nuts. More particularly, the invention relates to a self-locking nut of the kind disclosed in my co-pending application Serial No. 651,245, filed March 1, 1946, for Self-Locking Nut.

In the aforesaid application, there is disclosed a lock nut in which the locking action is effected by resilient, inwardly extending thread portions at one end of the nut.

An object of the invention herein disclosed is to provide a lock nut of the kind mentioned in which the inwardly extending thread portions have greater resiliency. Another object of the invention is to provide a lock nut of this kind that meets the exacting specifications of the aircraft industry. A further object of the invention is to provide a method of making such lock nuts comparatively inexpensively.

The invention is best explained by, and will be more readily understood from, a description of a specific lock nut and the steps of the method of making the lock nut which constitute embodiments of the invention and in which the foregoing objects, and certain advantages that will hereinafter appear, are realized. Such a lock nut is disclosed in the accompanying drawing together with illustrations of certain steps in the method of making the lock nut.

The drawing includes:

Fig. 1 which is a plan of a self-locking nut embodying the invention;

Fig. 2 which is an elevation of the same;

Fig. 3 which is an axial, sectional elevation of the same taken on the line 3—3 of Fig. 1;

Fig. 4 which is a plan of a blank used in making the nut;

Fig. 5 which is an axial, sectional elevation of the blank, shown with a tool therein;

Fig. 6 which is a plan of the blank, with the tool therein; and

Fig. 7 which is an axial, sectional elevation of the blank ready for tapping.

The lock nut 1 illustrated in Figs. 1 to 3 of the drawing is of hexagonal outer configuration to provide six wrench faces 2. The nut is bored axially and has a thread 3 therein. At one end of the nut, there is formed a locking section designated generally by the numeral 4.

The locking section of the particular nut illustrated consists of six resilient tangs 5 formed in the end portion of the nut. Each tang is contained within a wrench face and tangs are symmetrically disposed about the axis of the nut. The tangs have thread portions 6 on their inner surface and extend radially inwardly slightly beyond the normal diameter of the thread of the nut. Preferably, as illustrated, the tangs are of lesser thickness than the wall of the nut to provide greater resiliency.

The tangs are formed by shearing the metal of the nut. Each tang is formed by cutting or shearing through the wall of the nut at spaced longitudinal planes, spaced apart less than the width of a wrench face, from the end of the nut to a point or transverse plane 7 intermediate the ends of the nut. The shearing cuts completely through the wall. The tangs, as illustrated, are inclined inwardly to the axis of the nut.

In Figs. 4 to 7, certain steps in the method of making a nut such as the one described above are illustrated. Desirably, a nut blank 8 is formed on a header. This blank has an axial opening or a bore 9 therethrough and a thin wall section 10 at one end thereof. It is in this thin wall section 10 that the tangs are formed.

In forming the tangs a tool 11 is inserted in the section 10 of the nut. Primarily, the tool consists of a solid mandrel having six milled slots 12 extending from the end thereof to a point or transverse plane 13 spaced from the end a distance greater than the depth of the section 10. A pilot 13a on the mandrel extends into the bore of the nut blank. The mandrel fits snugly within the section 10 of the nut and supports the wall during the shearing of the tangs. The mandrel is inserted with the slots opposite the wrench faces. With the mandrel in place a shearing tool having shearing fingers 14 opposite the slots in the mandrel shears tangs 15 (Fig. 7) in the wall of the nut blank. This shearing tool is comparable to that shown in the aforesaid application Ser. No. 651,245.

The base 12a of each drilled slot 12 is tangent to the tap drill diameter of the nut. In the shearing operation, as described above, the inner surface of each tang is flattened against the base of the opposite slot in the mandrel so that the tang is tapered or thinned toward the free end thereof. About one third or more of the length of the tang is flattened against the base of the slot and lies in a plane tangential to the tap drill diameter of the nut. The tapering of the tang thus formed provides greater resiliency in the tang.

The blank (Fig. 7) so formed is tapped. The tap cuts threads or portions of the thread in the inner surface of the tangs. As the inner surface of each tang is flat and tangential to the tap drill diameter of the nut blank, portions of several convolutions of the thread are cut in each tang, and the thread portions feather away towards both side edges of the tang. Because of this, the mating with the thread on a bolt entered through the nut, is easy or kinder on the thread of the bolt. After the nut is tapped, the tangs are pressed inwardly so that the thread thereon extends inwardly beyond the normal diameter of the thread of the nut. As the tangs are thinner than the wall of the nut, converge toward the free end and are inclined inwardly from the outer surface, they have considerable resiliency.

In the shearing of the tangs, and particularly in pressing the tangs against the mandrel to flatten the inner surface thereof at the drill tap diameter, a flow of metal is effected by which, the above described, tapering of the tangs is effected. This operation "works" the metal of the tangs and effects a work hardening of the tangs. This work hardening increases the resiliency of the tangs, or rather their ability to move in and out on repeated reuse without abnormal fatigue of the material. It is also to be noted that the shearing that forms the tangs is effected in the direction of the fibers of the metal. This is important from the standpoint of repeated use.

Generally speaking, lock nuts used on aircraft are cadmium plated to avoid rust. Experience has shown that the lock nuts above described take plating to the extent of covering all of the exposed surfaces. In addition, the resiliency of the tangs and the feathering of the threads thereon are such that they do not injure or impair the plating on the thread of a bolt entered through the nut.

The tangs, due to their inward inclination, effect both a radial and axial resilient force between the nut and a mating threaded bolt entered therethrough. The axial force acts to take up the tolerance and effect a frictional engagement of the thread surface, throughout the length of the thread of the nut and in the direction of the engaging force exerted by drawing the nut home. In other words, the axial force is culminated with respect to the force exerted by drawing the nut home against an engaging surface.

Nuts such as that described above meet the exacting specifications and tests of the aircraft industry and are comparatively inexpensive to manufacture. Such a nut can be reused repeatedly without losing its effective locking action.

While but a single embodiment of the invention has been described, it will be obvious that various changes may be made by those skilled in the art in the details of the lock nut illustrated in the drawing and the steps of the method described above within the principle and scope of the invention as expressed in the appended claims.

I claim:

1. A self-locking nut comprising a body portion having an opening therethrough and a continuous thread therein of equal pitch throughout within the tolerance of the class thereof and a locking portion at one end of the nut body and integral therewith, which locking portion includes a plurality of axially extending sections, each alternate section being radially resilient and having spaced apart side faces substantially parallel to a radial plane of said nut and extending from the nut body to the free end of said locking portion, threads substantially similar and in phase with the first mentioned thread on the inner face of each said alternate section, each said alternate section being gradually displaced inwardly beyond the normal diameter of the first mentioned thread with the maximum displacement at said free end, the side faces of the sections intermediate said alternate sections abutting and slidably engaging adjacent side faces thereof.

2. A self-locking nut comprising a body portion having an opening therethrough and a continuous thread therein of equal pitch throughout within the tolerance of the class thereof and a locking portion at one end of the nut body and integral therewith, which locking portion includes a plurality of axially extending sections, each alternate section being radially resilient and having spaced apart side faces substantially parallel to a radial plane of said nut and extending from the nut body to the free end of said locking portion, the inner surface of each of said alternate sections being spaced outwardly of the opening through the nut body at the juncture thereof with the nut body and threads substantially similar and in phase with the first mentioned thread on the inner face of each said alternate section adjacent the free end thereof, each said alternate section being gradually displaced inwardly beyond the normal diameter of the first mentioned thread with the maximum displacement at said free end, the side faces of the sections intermediate said alternate sections abutting and slidably engaging adjacent side faces thereof.

3. A self-locking nut comprising a nut body comparable to a like, ordinary commercial nut of polygonal outer configuration to provide several wrench faces and having an axial bore therethrough and a continuous thread therein of equal pitch throughout within the tolerances of the class thereof, and a locking portion at one end of the nut body and integral therewith, which locking portion includes a plurality of axially extending sections, each alternate section being radially resilient and having side faces parallel to a radial plane of said nut spaced apart less than the width of the wrench face and extending from the nut body to the free end of said locking portion, threads substantially similar and in phase with the first mentioned thread on the inner face of each said alternate section, each said alternate section being gradually displaced inwardly beyond the normal diameter of the first mentioned thread with the maximum displacement at said free end, the side faces of the sections intermediate said alternate sections abutting and slidably engaging adjacent side faces thereof.

4. A self-locking nut as described in claim 3 in which the said intermediate sections include the corners of the nut and are substantially rigid.

5. A self-locking nut comprising a nut body comparable to a like, ordinary commercial nut of polygonal outer configuration to provide several wrench faces and having an axial bore therethrough and a continuous thread therein of equal pitch throughout within the tolerances of the class thereof, and a locking portion at one end of the nut body and integral therewith, which locking portion includes a plurality of axially extending sections, each alternate section being radially resilient and having side faces parallel to a radial plane of said nut spaced apart less than the width of the wrench face and extending from the nut body to the free end of said locking portion, the inner surface of each of said alternate sections being spaced outwardly of the opening through the nut body at the juncture thereof with the nut body and threads substantially similar and in phase with the first mentioned thread on the inner face of each said alternate section adjacent the free end thereof, each said alternate section being gradually displaced inwardly beyond the normal diameter of the first mentioned thread with the maximum displacement at said free end, the side faces of the sections intermediate said alternate sections abutting and slidably engaging adjacent side faces thereof.

HENRY O. ENGSTROM.

REFERENCES CITED

The following references are of record in the file of this patent:

UNITED STATES PATENTS

| Number | Name | Date |
| --- | --- | --- |
| 370,559 | Redmond | Sept. 27, 1887 |
| 1,903,921 | Rupf | Apr. 18, 1933 |
| 2,299,085 | Gade | Oct. 20, 1942 |
| 2,333,290 | Brackett | Nov. 2, 1943 |
| 2,349,513 | Mortus | May 23, 1944 |
| 2,381,110 | Chandler | Aug. 7, 1945 |
| 2,381,111 | Chandler | Aug. 7, 1945 |

FOREIGN PATENTS

| Number | Country | Date |
| --- | --- | --- |
| 545,484 | Great Britain | May 28, 1942 |
| 580,325 | Great Britain | Sept. 4, 1946 |
| 810,417 | France | Dec. 28, 1936 |